No. 684,008. Patented Oct. 8, 1901.
D. A. STRYKER.
FOCUSING HOOD FOR CAMERAS.
(Application filed May 23, 1900.)
(No Model.) 2 Sheets—Sheet I.
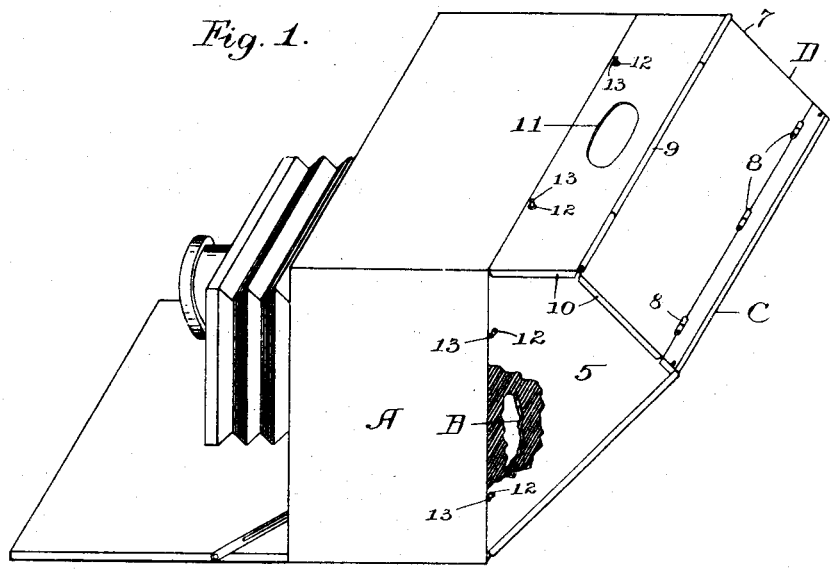
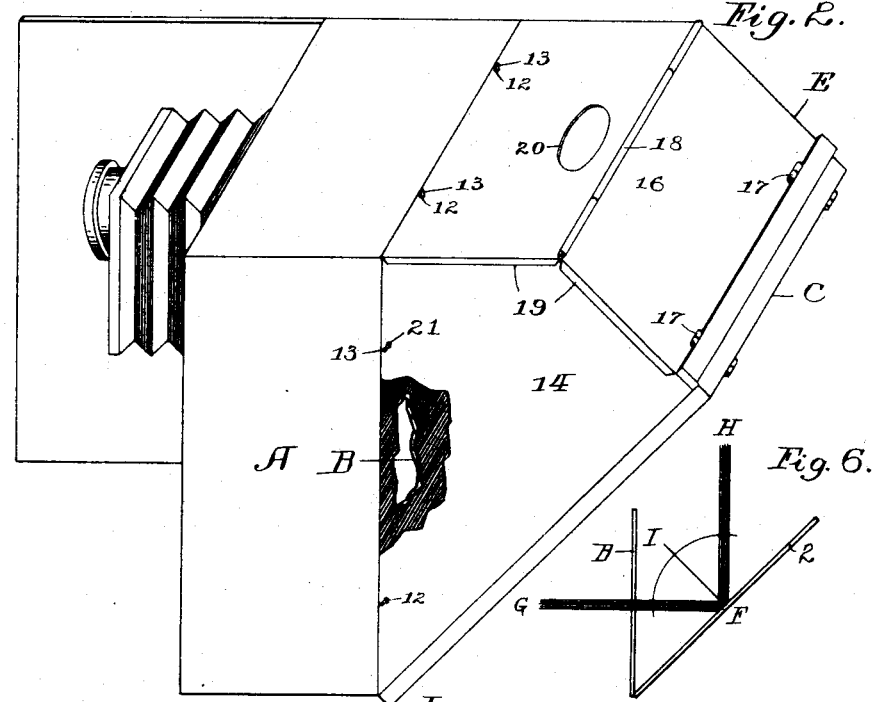
Witnesses:
L. E. Wickman
A. L. Thauwald
Inventor:
David A. Stryker.
by: Stryker & Godbury
Attorneys.

No. 684,008. Patented Oct. 8, 1901.
D. A. STRYKER.
FOCUSING HOOD FOR CAMERAS.
(Application filed May 23, 1900.)
(No Model.) 2 Sheets—Sheet 2.

Witnesses:
L. E. Wickman
A. L. Rauwald

Inventor:
David A. Stryker.
by Stryker & Bradbury
Attorneys.

UNITED STATES PATENT OFFICE.

DAVID A. STRYKER, OF MINNEAPOLIS, MINNESOTA, ASSIGNOR OF ONE-HALF TO HENRY C. STRYKER, OF SAME PLACE.

FOCUSING-HOOD FOR CAMERAS.

SPECIFICATION forming part of Letters Patent No. 684,008, dated October 8, 1901.

Application filed May 23, 1900. Serial No. 17,676. (No model.)

*To all whom it may concern:*

Be it known that I, DAVID A. STRYKER, a citizen of the United States, residing at Minneapolis, in the county of Hennepin and State of Minnesota, have invented certain new and useful Improvements in Focusing-Hoods for Cameras, of which the following is a specification.

My invention relates to focusing-hoods for cameras.

Its object is to provide means whereby a camera can be easily, quickly, and accurately focused.

Heretofore with cameras it has been customary to use a focusing-hood of cloth and a finder independent of the hood. With my invention these are combined. The image in cameras now in use appears to the operator inverted, while with my invention it is presented to the eye in its natural position.

My improvement consists of a hood holding a mirror, above which a peep-hole is made through the hood. This hood, as will be seen, is light in weight, durable, can be quickly attached to ordinary cameras, and when not in use detached and folded into a compact parcel.

Figure 3:
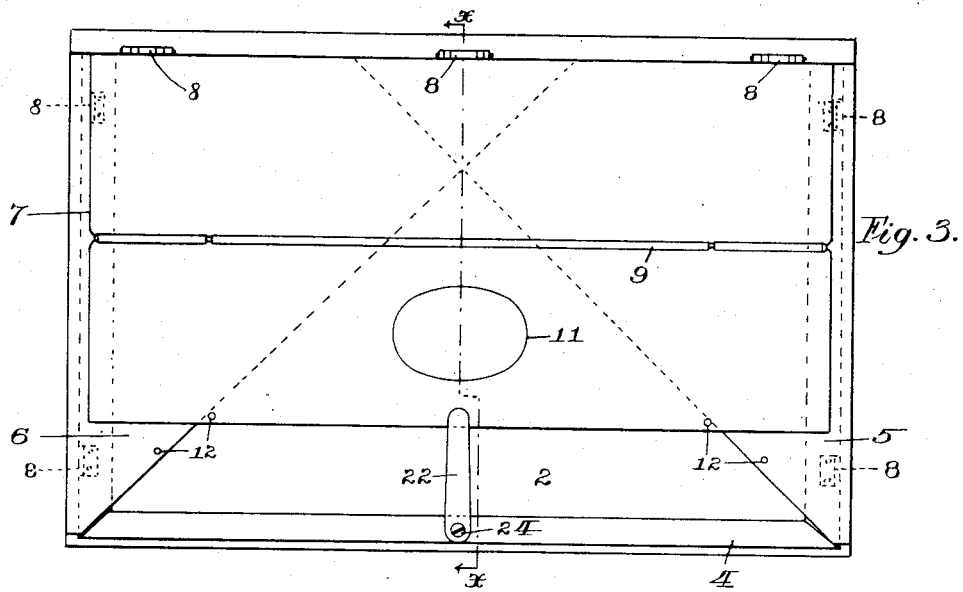
Figure 5:
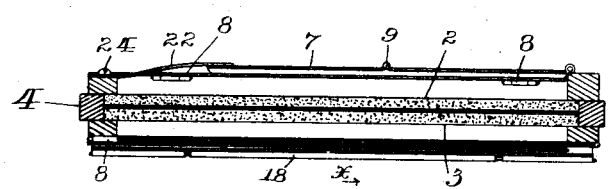
Figure 4:
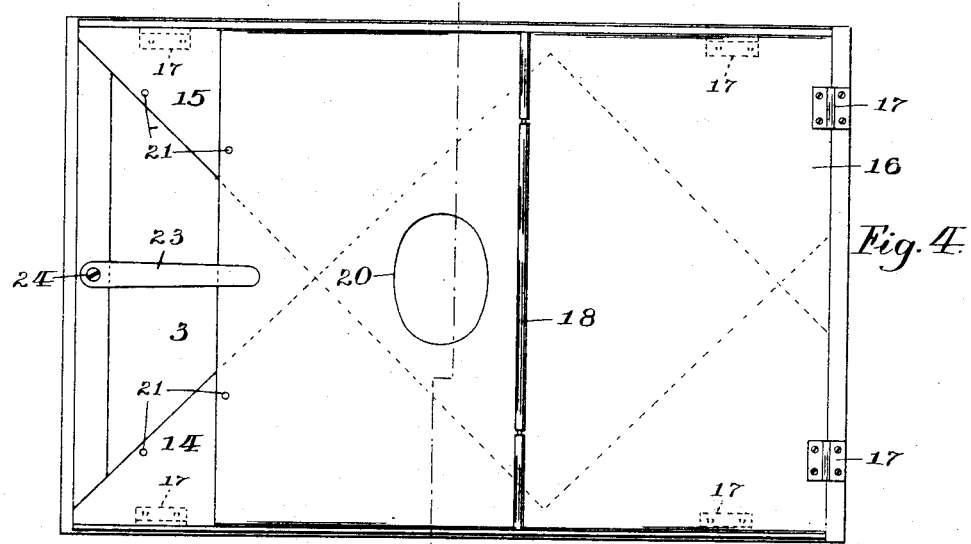

In the accompanying drawings, forming part of this specification, Figure 1 is a perspective view of a camera shown open and standing lengthwise with my improved focusing-hood attached thereto. Fig. 2 is a perspective view of the camera in upright position, showing the hood attached. Fig. 3 is a plan view of the focusing-hood folded looking toward its sides, which when unfolded are attached to the camera for taking a horizontal picture. Fig. 4 is a similar view looking at the reverse side of the hood, the flap seen being adapted to unfold and be attached to the camera for taking a vertical picture. Fig. 5 is a section of Figs. 3 and 4, taken, respectively, on the lines X X. Fig. 6 is a diagrammatic view of the screen and mirror, showing the angles of incidence and reflection.

In the drawings, let A represent a camera of ordinary construction, having the ground-glass focusing-screen B in its back.

The hood C is double in form, one section D of which is adapted for use in taking longitudinal and the other, E, vertical pictures. The sections are provided with mirrors 2 and 3, which are held back to back in the frame 4. Section D has side wings 5 and 6 and top wing 7, which are hinged at 8 to the base and positioned adjoining the mirror 2. The top wing is jointed by hinging at 9, so as to conform to the upper edges of the side wings. The edges of this wing are bent downwardly at 10, so as to assist in holding the side wings when this section of the hood is in use. The top wing is perforated at 11, so as to form a peep-hole through which the reflection in the mirror can be seen. The wings of the hood are provided with eyelets at 12 and the back of the camera with hooks 13, by which the hood is fastened to the camera. The wings are shaped so as to inclose the mirror back of the screen and when attached to the camera the mirror is inclined to the screen at an angle of incidence G F I equal to the angle of reflection I F H. Section E has side wings 14 and 15 and top wing 16, which are hinged at 17 to the base of the frame, holding the mirror 3. The top wing is jointed by hinging at 18, so as to conform to the upper edges of the side wings. The edges of this wing are bent downwardly at 19, so as to assist in holding the side wing when this section of the hood is in use. The top wing has peep-hole 20, through which the reflection in the mirror 3 can be seen. The wings have holes at 21, by which this section can be fastened to hooks 13 on the back of the camera. As with section D, the wings in section E inclose the mirror back of the screen, and the mirror is inclined to the screen at an angle of incidence equal to the angle of reflection to the peep-hole. The inner walls of the wings in both sections are blackened by paint, enamel, or other suitable opaque substances.

In use for taking a horizontal picture the wings of section D are attached by the hooks on the camera and the eyes in the wings to the back of the focusing-screen. For taking a vertical picture the wings of section E are similarly attached. In both cases the top wing is attached last, so that the inturned edges will overlap the side wings. The wings shut out the light from the side and render the chamber in the hood dark, so that the reflection in the mirror is very clear. Through the peep-hole the reflection of the image on the screen is seen in natural position, and the camera may then be accurately placed.

When not in use, the hood can be folded, as shown in Figs. 3 and 4, in which case the wings are held closed by clips 22 and 23, which are pivoted upon the base by screws 24.

While the hood shown has two sections, it is obvious that it can be constructed with but one without departing from the principles which I have applied.

In place of the wings shown the sides of my device may be made of cloth or other yielding material, in which case the hinges are unnecessary, and the hood when not in use may be crushed about the mirror, both protecting the same and forming a compact and convenient package.

Having described my invention, what I claim as new, and desire to protect by Letters Patent, is—

1. A device of the class described, consisting in combination with a camera and its focusing-screen, of a frame, a mirror carried by said frame, walls hinged to said frame, one of which has an opening for viewing the mirror, locking mechanism, and hooks and eyes by which the walls are adapted to be detachably connected to the camera; said mirror being inclined to the screen, the opening in the wall being positioned opposite the mirror and the walls adapted to fold upon the mirror and be held folded by the locking mechanism.

2. A detachable focusing-hood for cameras, consisting of mirrors, opaque walls hinged to and inclosing each of said mirrors, locking mechanism by which the walls are adapted to be held closed, and hooks and eyes by which the walls are detachable from the camera; said walls having openings opposite the face of each mirror.

In testimony whereof I have signed my name to this specification in the presence of two subscribing witnesses.

DAVID A. STRYKER.

Witnesses:
F. G. BRADBURY,
L. E. WICKMAN.